(12) United States Patent
Hong et al.

(10) Patent No.: US 9,237,584 B2
(45) Date of Patent: Jan. 12, 2016

(54) METHODS AND APPARATUS FOR MANAGING WIRELESS COMMUNICATION USING UNLICENSED FREQUENCY BANDS

(75) Inventors: Wei Hong, Beijing (CN); Na Wei, Beijing (CN); Haiming Wang, Beijing (CN); Jing Han, Beijing (CN); Chunyan Gao, Beijing (CN); Wei Bai, Beijing (CN); Gilles Charbit, Farnborough (GB)

(73) Assignee: BROADCOM CORPORATION, Irvine, CA (US)

( * ) Notice: Subject to any disclaimer, the term of this patent is extended or adjusted under 35 U.S.C. 154(b) by 102 days.

(21) Appl. No.: 14/122,743

(22) PCT Filed: May 30, 2011

(86) PCT No.: PCT/CN2011/074878
§ 371 (c)(1),
(2), (4) Date: Nov. 27, 2013

(87) PCT Pub. No.: WO2012/162875
PCT Pub. Date: Dec. 6, 2012

(65) Prior Publication Data
US 2014/0087748 A1    Mar. 27, 2014

(51) Int. Cl.
*H04W 74/04*    (2009.01)
*H04W 72/12*    (2009.01)
*H04W 74/08*    (2009.01)

(52) U.S. Cl.
CPC .......... *H04W 74/04* (2013.01); *H04W 72/1215* (2013.01); *H04W 74/0816* (2013.01)

(58) Field of Classification Search
CPC .................................................... H04W 74/04
USPC ...................... 455/452.1, 509, 450
See application file for complete search history.

(56) References Cited

U.S. PATENT DOCUMENTS

| 7,113,497 | B2 | 9/2006 | Cromer et al. |
| 7,650,151 | B2 | 1/2010 | Medepalli et al. |
| 2009/0005057 | A1* | 1/2009 | Lee et al. ........................ 455/450 |
| 2011/0287794 | A1* | 11/2011 | Koskela et al. ............... 455/509 |
| 2011/0319069 | A1* | 12/2011 | Li ............................. 455/422.1 |
| 2012/0077510 | A1* | 3/2012 | Chen et al. ................. 455/452.1 |
| 2013/0344883 | A1* | 12/2013 | Rinne et al. ................. 455/452.1 |

* cited by examiner

*Primary Examiner* — Marisol Figueroa
*Assistant Examiner* — Jean Chang
(74) *Attorney, Agent, or Firm* — Oblon, McClelland, Maier & Neustadt, L.L.P.

(57) ABSTRACT

Systems and techniques for managing the use of industrial-scientific-medical bands for cellular network communication. An apparatus comprises a processing system and a memory storing a set of program instructions. The processing system is configured to cause the apparatus to receive channel information from a UE reporting the control of an industrial-scientific-medical (ISM) band channel by the UE and cause the apparatus to schedule a communication session with the UE over the channel, with the channel being configured and activated as an ISM secondary component carrier (SCC). The apparatus may further request one or more user equipments (UEs) to report their wireless fidelity (WiFi) capability and request user equipments having WiFi capability to compete for the wireless medium and report occupation of the wireless medium in the form of a request to send command, to which the apparatus responds with a clear to send command.

20 Claims, 12 Drawing Sheets

METHODS AND APPARATUS FOR MANAGING WIRELESS COMMUNICATION USING UNLICENSED FREQUENCY BANDS

FIELD OF THE INVENTION

The present invention relates generally to wireless communication. More particularly, the invention relates to improved systems and techniques for extending wireless network capability by using unlicensed portions of the radiofrequency spectrum.

BACKGROUND OF THE INVENTION

The following abbreviations that may be found in the specification and/or the drawing figures are defined as follows:

802.11 IEEE Std 802.11-2007 and predecessor and successor standards
CE Control Element
DCF distributed coordination function
DIFS distributed interframe space
ISM industrial-scientific-medical
LCID logical channel ID
MAC medium access control
ms millisecond
PC point coordinator
PCF point coordination function
PIFS PCF interframe space
SCC secondary component carrier
SIPS short interframe space
UCI uplink control information
UE user equipment
WM wireless medium
WIFI wireless fidelity Interest in wireless communication, particularly personal wireless communication, has increased more and more during the last few decades, and user demand for the ability to transmit and receive information wirelessly has proven insatiable. More and more users wish to spend more and more of their time communicating with one another, sharing data with others, and receiving data made available to the public at large or to large groups of users, so that serving the simultaneous activities of these users while providing an acceptable quality of service to each user has proven more and more challenging. Manufacturers and operators of wireless communication systems such as cellular networks have gone to great lengths to increase the data that can be carried in the portion of the radiofrequency spectrum allocated to them. Continued advances in the efficient use of the radiofrequency spectrum to carry data have led from the first wireless transmissions in the 1800's to the present day's ubiquitous presence of wireless data communication in every aspect of everyday life.

SUMMARY OF THE INVENTION

In a first embodiment of the invention, an apparatus comprises a processing system comprising at least one processor and a memory storing a set of computer instructions. The processing system is configured to cause the apparatus to receive channel information from a UE reporting the control of an industrial-scientific-medical (ISM) band channel by the UE and to cause the apparatus to schedule a communication session with the UE over the channel, with the channel being configured and activated as an ISM secondary component carrier (SCC).

In a second embodiment of the invention, an apparatus comprises a processing system comprising at least one processor and a memory storing a set of computer instructions. The processing system is configured to cause the apparatus to receive a command from a base station to compete for control of a wireless medium comprising a portion of an industrial-scientific-medical (ISM) radiofrequency band, and, upon control by the apparatus of the wireless medium, to cause the apparatus to report to the base station channel information relating to the channel controlled by the apparatus.

In a third embodiment of the invention, a method comprises receiving channel information from a UE reporting the control of an industrial-scientific-medical (ISM) band channel by the UE and scheduling a communication session with the UE over the channel, with the channel being configured and activated as an ISM secondary component carrier (SCC).

These and other embodiments and aspects are detailed below with particularity.

DETAILED DESCRIPTION OF THE PREFERRED EMBODIMENTS

Figure 1:
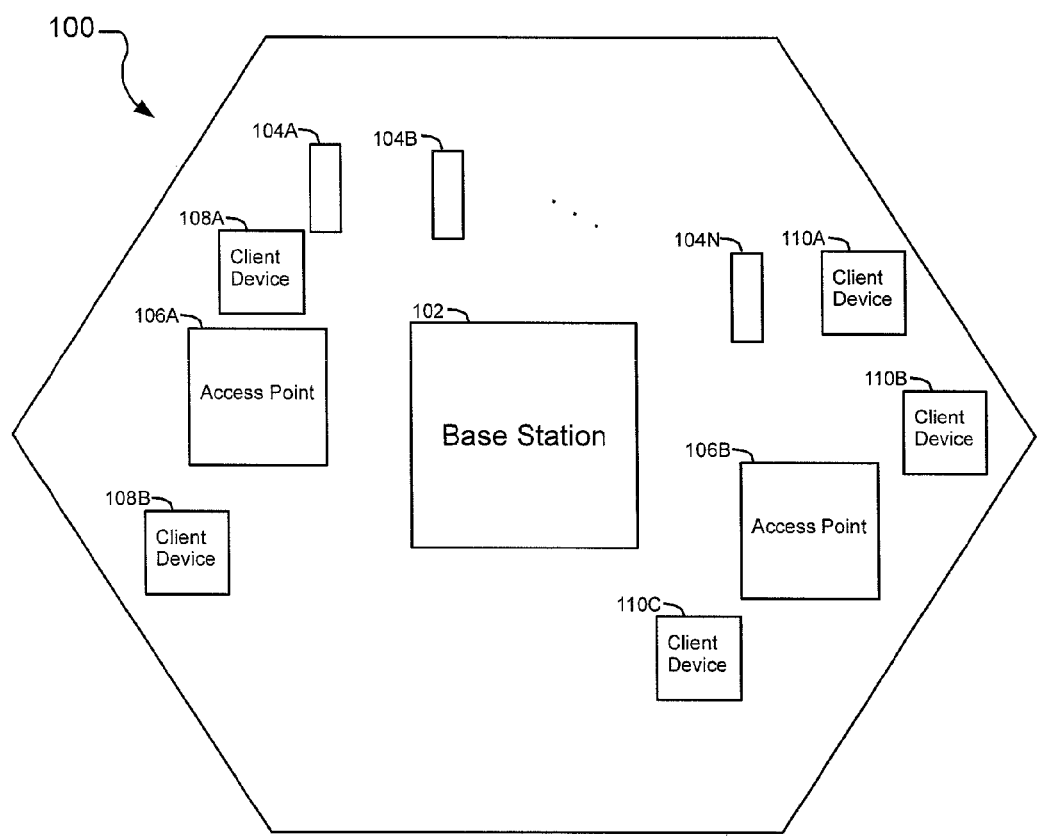
FIG. 1 illustrates a cell of a wireless network operating according to an embodiment of the present invention.

Systems and techniques according to various embodiments of the present invention recognize that the radiofrequency spectrum specifically allocated to use by cellular communication systems is limited, and that the need to operate within a limited spectrum imposes significant constraints on the communication capacity of any system. As the number of users increases, and as the demands of users increase, the load on a system increases. System capacity can be increased up to a point by the deployment of new communications infrastructure, but such deployment is costly and in addition can only meet communication needs up to a certain point. If the radiofrequency spectrum available to users of a network is being used at full capacity by users within a geographic area, the addition of new infrastructure such as new base stations will not increase the capacity of the network within that area because the limitation is imposed not by the available infrastructure, but by the capacity of the available radiofrequency spectrum to carry data.

The radiofrequency spectrum allocated to systems such as cellular networks is determined by government licensing authorities, who need to manage allocation between a host of competing claimants. Licensing for particular uses is typically conducted after much study, and weighing of the needs of various interests, and allocations can be expected to remain relatively fixed. Even when allocations change, there is no particular reason to believe that the result will be an increased allocation to users of cellular networks.

A number of radiofrequency bands have been made available for unlicensed uses. Bands have been made available for radio emissions used in industrial, scientific, and medical applications, and these bands are referred to as ISM bands. In the past, ISM bands were not used for communication, but more recently ISM bands have been employed for applications such as cordless telephones and wireless computer networking. Wireless computer networking is popularly known as WiFi. Many businesses, organizations, and institutions provide wireless internet access points that serve members of the public, and many wireless communication devices, or UEs, designed to operate using licensed cellular communication bands also have WiFi capabilities in order to take advantage of publicly accessible access points, as well as access points such as business or home access points.

The availability of ISM bands, and the ability of many UEs to operate in the ISM bands, opens up significant possibilities for expanded bandwidth for communication. Regulatory provisions defining the ISM bands and exempting them from licensing do not specify the communications uses to which they may be put, and it is possible for a UE equipped with WiFi capabilities to communicate to entities other than a wireless networking access point or wireless networking access client using those capabilities.

Embodiments of the present invention recognize both the availability of ISM bands and the need to avoid interference with other users of the ISM bands. If a cellular network base station, such as a NodeB or eNodeB, is capable of transmitting and receiving over ISM bands and a UE is equipped with a WiFi module and is therefore capable of transmitting and receiving over ISM bands, there is no technical reason why cellular networks cannot deliver substantial portions of their communication over the ISM bands without regard to the needs of other existing communication uses.

However, such an approach would not be accepted by the numerous users of communication systems such as cordless telephones, home and business wireless networks, municipal wireless providers, and other parties who use the ISM bands for communication.

Various embodiments of the present invention, therefore, provide systems and techniques for managing use of ISM bands by elements of cellular networks, with specific attention to efficient use of the ISM bands. Embodiments of the invention recognize that not all UEs operating in a cellular network have WiFi capability, and that attempting to communicate over the ISM bands with UEs lacking WiFi capability wastes resources of the network to which a base station a UE belong and also burdens other users of the ISM bands to no purpose. In addition, embodiments of the invention recognize that using information relating to the communication environment leads to increase communication efficiency and that the various elements of a network operating within the communication environment provide significant sources of information that can be used to increase efficiency.

FIG. 1 illustrates a cell 100 of a wireless network 101 operated according to embodiments of the present invention. The cell 100 is served by a base station 102, which may suitably be implemented as an eNodeB. The base station 102 serves a number of UEs, such as the UEs 104A, 104B, ..., 104N. The cell 100 is a geographic area and devices in the geographic area and belonging to the network 101 are served by the base station 102, but numerous other devices using various communication services that are not part of the wireless network 101 may be present and operating in the cell 100. These may include UEs operating as parts of competing wireless networks, cordless telephones, and devices communicating through wireless networking. Devices communicating through wireless networking are often referred to as 802.11 stations. An 802.11 station is defined as any device following the 802.11 protocol. The 802.11 protocol is designed to avoid collision between devices and to prevent a device from monopolizing the wireless medium. The standard architecture of the 802.11 medium access control layer includes the distributed coordination function (DCF) and the point coordination function (PCF), illustrated in FIGS. 2A and 2B and described in greater detail below. In the present example, all of the UEs 104A, 104B, ..., 104N include components allowing for communication with the base station 102 over licensed frequencies associated with the network and some of the UEs also have dedicated WiFi modules adapted for communication using the 802.11 standard. In particular, the UE 104A includes such a dedicated WiFi module and the UE 104B does not have such a dedicated WiFi module.

Located in the geographic area of the cell 100 are wireless access points (APs) 106A and 106B, with the access point 106A serving the client devices (non-AP stations) 108A and 108B and the device 106B serving the client devices (non-AP stations) 110A, 110B, and 110C. For purposes of illustration, the cell 100 is shown here as including only a few UEs and a few access points and stations, but it will be recognized that a typical macro-cell may have a radius of between 1 and 20 km and a micro-cell may have a range of between 400 meters to 2 km. In a reasonably densely populated area, even a micro-cell may include a large number of UEs and a substantial number of wireless networks. For example, the geographic area of a micro-cell may include several businesses operating open wireless networks as an accommodation to their customers, and a substantial number of apartments, with many or most of the occupants operating their own home wireless networks. To use the ISM band within such an environment, the base station 102 and the UEs 104A, ..., 104E operate in ways that recognize the need to share the wireless medium with what may be a large number of other users and to use available resources to achieve efficiency in operation.

To this end, the base station 102 and the UEs communicate in various ways relating to increasing the efficiency of their use of the ISM band and managing the timing of their use in ways that respect the needs of other users. The base station 102 and the UEs 104A, ..., 104E, and other components operating in a network according to embodiments of the present invention, implement various improved capabilities that will be summarized here and discussed in greater detail below. Such techniques include:

The ability for a base station to request a UE to report its WiFi capability, the ability of a UE to report its WiFi capability, and particular signaling formats and techniques for such requesting and reporting.

Specific request to send and clear to send signals exchanged between the base station and the UE, and configuration and activation of the ISM SCC in response to such commands.

The ability of the UE to report ISM channel information, and the ability of the base station to use the information to determine whether to use an ISM channel suggested by the UE.

The ability of the base station and the UE to use various mechanisms to determine the duration of their occupation of the wireless medium.

Figure 2A:
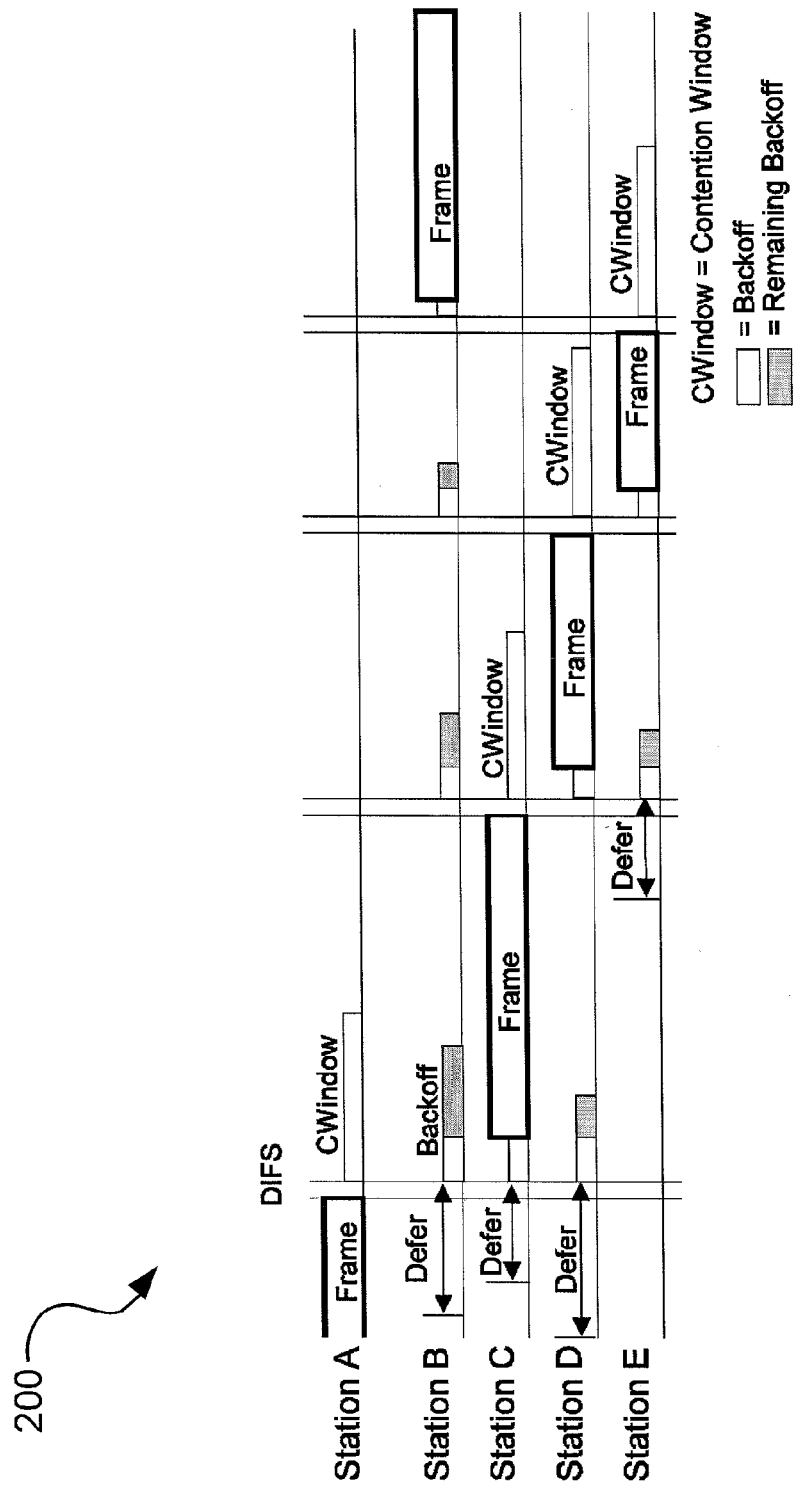
FIG. 2A illustrates a diagram showing operation of the distributed coordination function of the 802.11 standard.

As noted above, the 802.11 standard defines the distributed coordination function (DCF) and the point coordination function (PCF) of the medium access control (MAC) sublayer. FIG. 2A is a diagram 200 illustrating relative timing sequences for stations A-E as the stations engage in DCF operation. Each of the stations A-E begins a transmission only after detecting the channel as being idle for a minimum duration called the DCF inter-frame space, or DIFS, plus an additional random time called its backoff time. If a station finds the channel busy during the DIPS, the station defers its transmission. The timing sequences are divided into segments called contention windows, and each of the stations transmits only during a contention window beginning after it has sensed the channel as being idle and then waited during its backoff time.

Figure 2B:
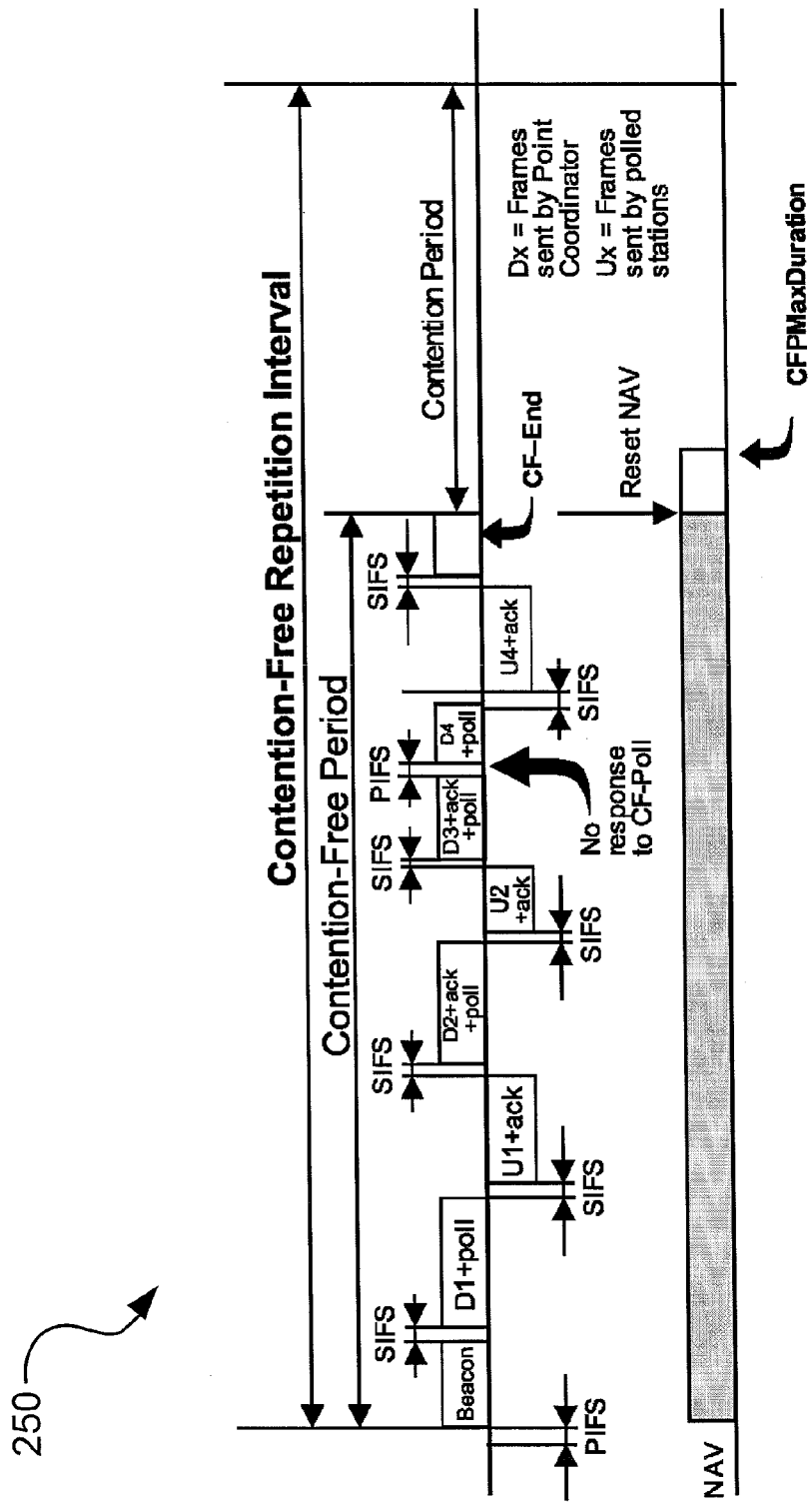
FIG. 2B illustrates a diagram showing operation of the point coordination function of the 802.11 standard.

FIG. 2B is a diagram 250 illustrating the timing of point cooperation function (PCF) operation. PCF is controlled by a point coordinator, which uses a poll and response protocol to eliminate the possibility of contention for the medium. The point coordinator regularly polls the stations for traffic while also delivering traffic to the stations. The PCF is built over the DCF. The point coordinator (PC) begins a period of contention free operation during which the PCF is operating. This period is called contention free because access to the medium is completely controlled by the PC, and stations are prevented from gaining access to the medium under DCF. In the present illustration, the PC polls each of the stations in turn. A responding station responds to the poll after a short inter-frame space (SIFS), sending its transmission and an acknowledgement. After another short inter-frame space, the PC polls the next station, and sends an acknowledgement if it has received a transmission. Thus, the PC polls the first station, receives a transmission and an acknowledgement, sends an acknowledgement and polls the second station, receives a transmission and an acknowledgement, and sends an acknowledgement and polls the third station. The PC fails to receive a response to its poll of the third station, so it polls the fourth station. After the PC has received an acknowledgement and a transmission from the fourth station, and after a SIFS, the contention free period is at an end.

One or more of the elements of the network 101, such as the base station 102 and one or more of the UEs 104A, . . . , 104N suitably employ one or both of the distributed coordination function and the point coordination described above during part of their operation. Such operation allows for a device to gather information relating to available channels in the ISM band and determine the duration during which a channel may be configured and used as an ISM SCC.

Figure 3:
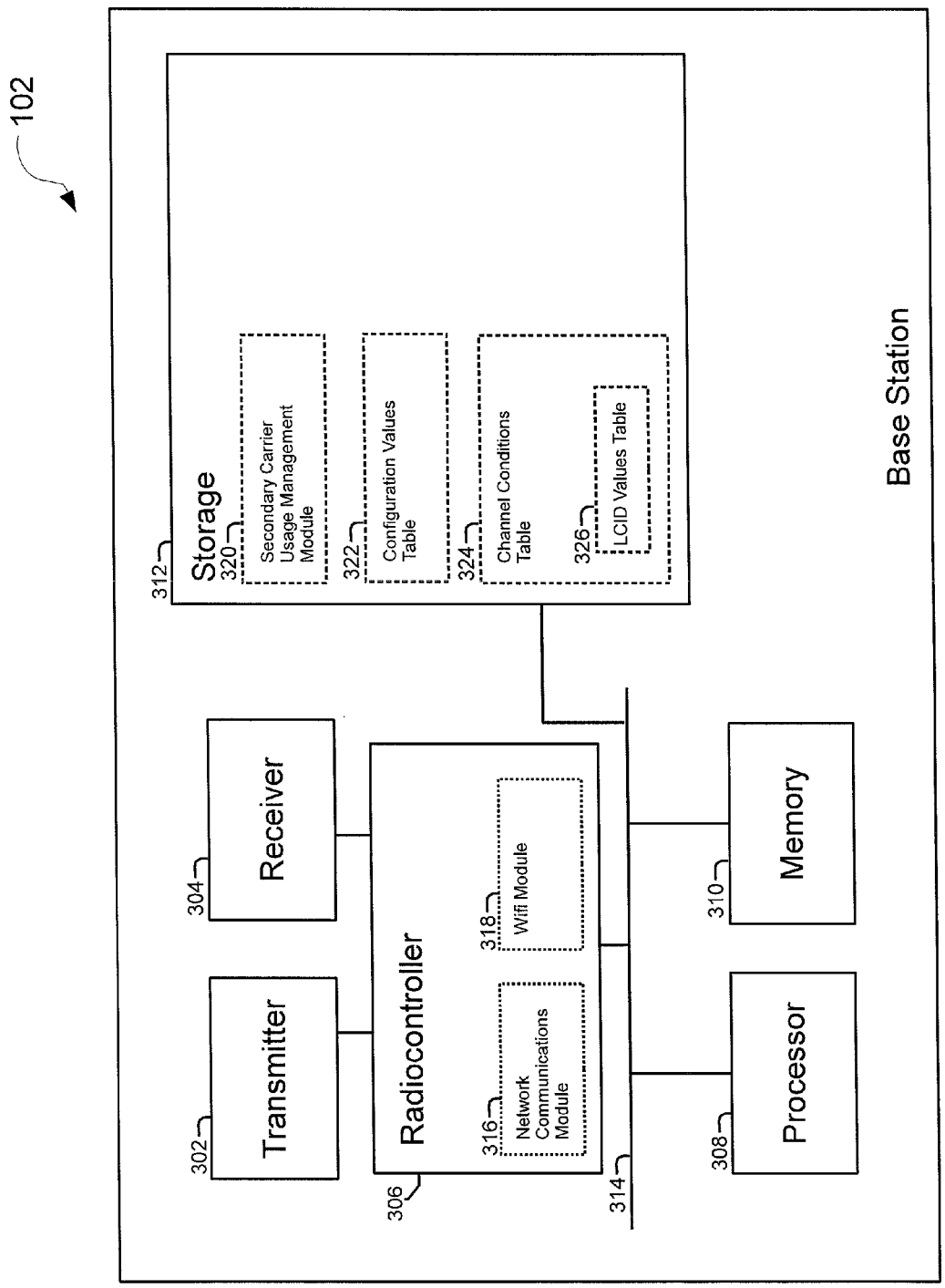
FIG. 3 illustrates a base station according to an embodiment of the present invention.

FIG. 3 illustrates additional details of the base station 102. A network including the base station 102 may suitably include a large number of additional base stations, some or all of which may be configured similarly to the base station 102.

The base station 102 and the UE 104A are both suitably equipped to communicate data using secondary component carriers (SCCs) in the ISM band, or ISM SCCs. An SCC is a carrier other than the primary component carrier used by a device. The primary component carrier is conventionally always in a licensed band and is associated with protocols used by a network in which the device operates. The base station 102 comprises a transmitter 302, receiver 304, and radiocontroller 306, as well as a processor 308, memory 310, and storage 312. The processor 308, memory 310, and storage 312 suitably communicate with one another and with the radiocontroller 306 over a bus 314. The base station 102 may suitably implement a network communications module 316 and a WiFi module 318. The network communications module 316 and the WiFi module 318 may suitably be implemented as functions of the radiocontroller 306, with the transmitter 302 and the receiver 304 suitably being adjustable to use the frequencies and protocols needed by either of the network communications module 316 or the WiFi module 318, although it will be recognized that the ability to use multiple communication mechanisms may be implemented in any number of ways or combinations of ways, such as through the use of multiple transmitters and receivers, through the use of multiple radiocontrollers, or through the direction of the actions of a radiocontroller by other components, for example.

The network communications module 316 suitably allows for operation using licensed network frequencies as well as direct communication with UEs using the ISM wireless medium but without using the 802.11 standard. Typically, the network communications module 316 communicates using ISM SCC frequencies and protocols as part of a session that has already been established, and continues occupation of the wireless medium during the session. The establishment of the parameters of the session may be accomplished, for example, using information exchanged between the base station and a UE such as the UE 104A.

The WiFi module 318 suitably uses the 802.11 standard to transfer data and control information between the base station 102 and the UE 104A and other UEs, operating as a station in the 802.11 environment. Through such operation, the base station 102 is able to exchange information with the UE 104E and other UEs without using the licensed network band and without monopolizing the ISM wireless medium. It will, however, be recognized that such information exchange may be conducted using the licensed network band and that various embodiments of the invention may use different mechanisms to exchange control information between base stations such as the base station 102 and UEs such as the UE 104A and other UEs.

For example, a base station such as the base station 102 may be deployed with or without a WiFi module such as the WiFi module 318 and some UEs deployed in a cell such as the cell 100 may include WiFi modules while other UEs do not include WiFi modules, and the base station 102 may receive information from a UE with WiFi capability that is useful in configuring communications with a UE that does not have WiFi capability.

Once the base station 102 has exchanged control information and conducted needed configuration and activation procedures to allow use of the ISM wireless medium, the base station 102 may then use the network communications module 316 to communicate with the UE 104A using the ISM band as an SCC. As discussed in additional detail below, the base station 102 is also able to use the wireless medium to communicate with other UEs that may not have WiFi capability after the base station's occupation of the ISM wireless medium has been established through information exchange and control signaling with a UE that does possess WiFi capability.

The base station 102 may also implement a secondary carrier usage management module 320, suitably implemented as software residing in storage 312 and transferred to memory 310 as needed for execution by the processor 308. When an excessive traffic load is present between the base station and the UE 104A or another UE, the UE 104A and the base station 102 may cooperate to establish use of an ISM SCC channel, and the secondary carrier usage management module 320 suitably manages the decisions and actions by the base station 102 directed to such usage. The secondary carrier usage management module 320 directs the use and control by the base station 102 of an SCC, and may also direct the operation of elements of the base station 102 and the UE 104A and other UEs needed to establish and to conduct communications over the SCC.

The base station 102 may also store a configuration values table 322. The configuration values table 322 comprises values for configuring an ISM SCC. The configuration values table 322 may be compiled for transmission to the UE based on channel conditions known to the offload management module, such as through a report by a UE, or may comprise predetermined values stored by both the base station 102 and each UE for which an ISM SCC is to be configured. The base station 102 also stores a channel conditions table 324, comprising ISM channel values, suitably reported by a UE. As described below in greater detail, the UE may report ISM channel values in the form of a Medium Access Control Control Element (MAC CE) according to an embodiment of the present invention, including appropriate logical channel ID (LCID) values. The MAC CE, including the LCID values, may be received from a UE during uplink reporting and may be stored in the table 324, with the LCID values being stored in the table 326. A specific configuration values table, channel conditions table, and LCID values table are illustrated in FIG. 3 and discussed here for convenience of illustration and description, but it will be recognized that values may be gathered, received, and used as needed, and grouped as needed, without necessarily being stored in forms similar to the tables discussed here.

Figure 4:
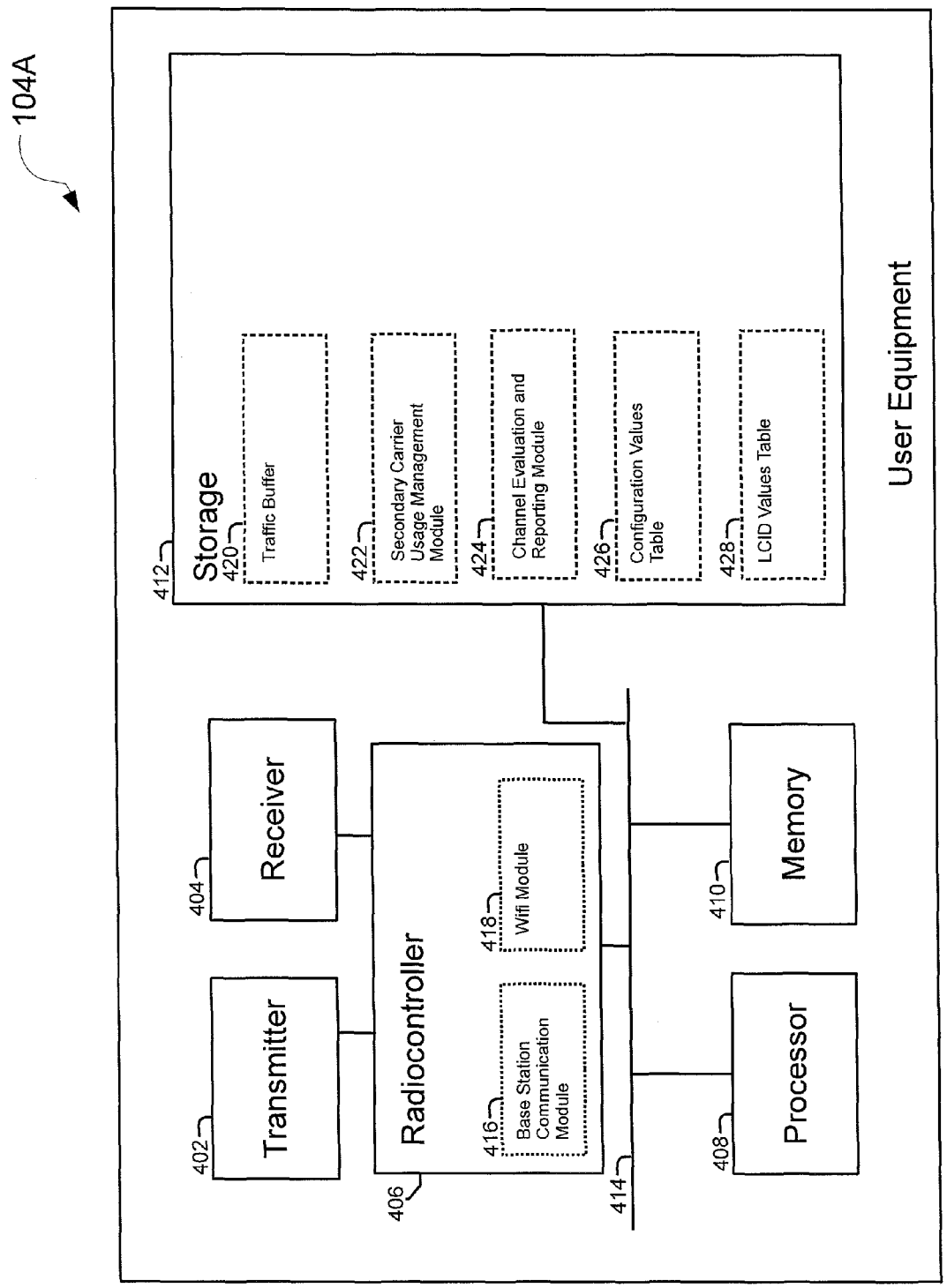
FIG. 4 illustrates a user equipment according to an embodiment of the present invention.

FIG. 4 illustrates further details of the UE 104A. The remaining UE's 104B, . . . , 104N may suitably be configured in a variety of ways that allow them to communicate with the base station 102, with one notable variation being that some UEs may lack a WiFi module 418 discussed below as an element of the UE 104A.

The UE 104A comprises a transmitter 402, receiver 404, and radiocontroller 406, as well as a processor 408, memory 410, and storage 412. The processor 408, memory 410, and storage 412 suitably communicate with one another and with the radiocontroller 406 over a bus 414. The base station 102 may suitably implement a base station communication module 416 and a WiFi module 418. Both of the base station communication module 416 and the WiFi module 418 may be conventional components of a UE, such as the UE 104A, providing the capability of operating as a wireless communication client, and may be implemented as functions of the radiocontroller 406 or through any number of other mechanisms of combinations of mechanisms. The base station communication module 416 may also provide the UE 104A with the capability of configuring, activating, and communicating using a secondary component carrier such as an ISM SCC, while the WiFi module 418 provides the UE 104A with the ability to compete for ISM channels following the 802.11 protocol. Once the UE 104A has established occupancy of an ISM channel through the operation of the WiFi module 418, the channel may be configured as an ISM SCC and the UE 104A may use the base station communication module 416 to communicate with the base station 102 over the ISM SCC.

The UE 104A also comprises a traffic buffer 420 that buffers traffic to be transmitted to the base station 102.

The UE 104A also implements its own secondary carrier usage management module 422, suitably implemented as software residing in storage 412 and transferred to memory 410 as needed for execution by the processor 408. The secondary carrier usage management module 422 notifies the base station 102 when the amount of traffic stored in the traffic buffer 420 is excessive, for example, if the traffic level exceeds a predetermined threshold. If the amount of traffic is excessive, the base station 102 makes decisions relating to whether to use the ISM band to accommodate some of the traffic, and the secondary carrier usage management module cooperates with the base station 102 in such use of the ISM band.

The base station 102 may use any of a number of criteria to determine that a portion of its traffic needs to be transmitted using the ISM bands, such as an evaluation of its overall traffic load, a notification by the UE that it is experiencing a traffic load above a predetermined threshold, a favorable condition of an ISM channel, or any number of other criteria.

When the base station 102 needs to offload traffic with the UE 104A, that is, to communicate all or a portion of the traffic to be communicated between itself and the UE 104A on the wireless medium represented by the ISM band, the base station 102 may suitably send a command to the UE 104A to invoke its WiFi module and compete for the wireless medium. The UE 104A competes for the wireless medium using the procedures defined by the 802.11 standard, and typically employs the distributed coordination function defined by that standard. By competing for the wireless medium in this way, the UE 104A is able to occupy the wireless medium in an orderly manner and in so doing to obtain valuable information relating to the channel conditions prevailing in the wireless medium of the ISM band in its environment. Such information includes the frequencies available, the traffic load on the various frequencies, the competition for the wireless medium presented by other stations in the vicinity, and other useful information.

Once the UE 104A controls the wireless medium, the UE 104A may evaluate the channel conditions using a channel evaluation and reporting module 424. The channel evaluation and reporting module 424 may suitably collect information relating to the occupation of the wireless medium by the UE 104A and may report information such as the frequency being used, the duration of occupation by the UE 104A, the waiting time before the UE 104A was able to occupy the wireless medium, and other relevant information. Of particular interest is the duration of occupation of the wireless medium by the UE 104A, because the base station 102 is able to use the wireless medium during this time, whether or not the UE 104A needs to transmit or receive data during all of the time available. As previously noted, not all of the UEs need to have WiFi capability, and the UE 104B in the present example has been specifically identified as lacking a WiFi module such as the module 418. As discussed in greater detail below, the base station 102 is able to receive channel duration information from a UE and use that channel duration information to schedule communication with UEs that have not themselves evaluated the channel and that may lack the capability of evaluating the channel. In addition, if needed or desired, the base station 102 may receive channel information from, for example, the UE 104A and then configure the channel and communicate with the UE 104B over the channel for the duration indicated by the information received from the UE 104A.

One exemplary mechanism for reporting by a UE such as the UE 104A is by means of an uplink control information (UCI) format according to an embodiment of the present invention, with parameters being assigned to sequences of bits in the transmission as follows:

| Bits | $b_0b_1b_2b_3$ | $b_4, \ldots, b_k$ | $b_{k+1},$ $\ldots, b_n$ | $b_{n+1}, \ldots,$ $b_{n+m}$ |
|---|---|---|---|---|
| Fields | No WiFi channel reserved | | | |
| | WiFi channel #1 reserved | WiFi channel #1 RRC parameter set | Time tag | channel duration |
| | WiFi channel #2 reserved | WiFi channel #2 RRC parameter set | Time tag | channel duration |
| | ... | ... | ... | ... |
| | WiFi channel #14 reserved | WiFi channel #14 RRC parameter set | Time tag | channel duration |

The bit sequence $b_0b_1b_2b_3$ is the WiFi channel reserved index field which indicates which WiFi channel was reserved.

The bit sequence $b_4, \ldots, b_k$ is the WiFi channel#i radio resource control (RRC) parameter set field. The RRC parameter set field indicates which set of RRC parameters apply for the reserved WiFi channel. Parameters may differ based on the ISM band. For example, parameters defining ISM bands in China are different from those in the United States. These parameter sets are predefined via higher-layer signaling and may include, for example:
 WiFi channel index
 ISM band
 Maximum transmission power allowed on ISM band The bit sequence $b_{k+1}, \ldots, b_n$ is the time tag field which can be based on the single frame number (SFN) and is used by the UE to indicate when the wireless medium is reserved. The time tag need not occupy the full SFN number, but may appear, for example, in last 2-3 digits, or may indicate some SF offset relative to the uplink single frame used for UL UCI transmission, to allow for some latency and save some bits. This approach allows flexibility in sending UL UCI. For example, it is possible to send the UL UCI in the first available UL SF in a given TDD configuration. If traffic offloading is needed, the next available UL SF for UL UCI transmission may lead to some extra latency.

The bit sequence $b_{n+1}, \ldots, b_{n+m}$ is the channel duration field, which may not be needed. For example, if desired, the UE may set the wireless media reservation time to be a constant value such as 32 ms to save some bits. For example, a 15-bit value may be needed to indicate up to 32 ms WM reservation time, but this signaling burden can be avoided by simply setting the default reservation time to 32 ms.

If the secondary carrier usage management module 320 determines that the channel is to be used, the secondary carrier usage management module 320 may direct the base station 102 to configure the ISM channel as an SCC, for example, by sending appropriate commands to the radiocontroller 306 to direct the network communication module 316 to configure the radiocontroller 306, receiver 302, and transmitter 304 to use the ISM band as an SCC, and to direct one or both of the WiFi module 318 and the network communication module 316 to carry out communication with the UE 104A to direct the UE 104A to configure the ISM channel as an SCC. As an alternative to explicitly configuring the channel, it is possible for the parameters used for SCC configuration to be predefined at the base station 102 and the UE 104A, for example by storing the desired parameters in the configuration values table 322 of the base station 102 and a corresponding configuration values table 426 of the UE 104A. After the ISM SCC is configured, the ISM SCC is activated. Once the ISM SCC is activated, the base station 102 and the UE 104A may conduct communication over the ISM wireless medium using the network communication module 316 of the base station and the base station communication module 416 of the UE 104A. Once the UE 104A has finished communicating, or if the UE 104A or the base station 102 has determined that the base station 102 will communicate with other UEs, the base station 102 communicates with one or more other UEs for the duration during which the ISM wireless medium is controlled.

The UE 104A and similar UEs may construct a table 428 of LCID values to be transmitted in the form of a MAC CE, compiling channel conditions information along with additional information to be transmitted to the base station 102. The table 428 may include entries similar to those shown below.

| Index | LCID values |
|---|---|
| 00000 | CCCH |
| 00001-01010 | Identity of the logical channel |
| 01011-11000 | Reserved |
| 11001 | ISM Report |
| 11010 | Power Headroom Report |
| 11011 | C-RNTI |
| 11100 | Truncated BSR |
| 11101 | Short BSR |
| 11110 | Long BSR |
| 11111 | Padding |

Of particular interest is the ISM report, which may include fields similar to those shown here:

| Channel Index | Duration | Oct 1 |
|---|---|---|
| Duration | | Oct 2 |
| Duration | | Oct 3 |

The channel index field identifies the WiFi channel controlled by the UE. A suitable length for the field is 4 bits. The duration field identifies the length of time the UE will occupy the WiFi channel. A suitable length for the duration field is 20 bits. Reporting can therefore be accomplished by a slight addition to a status report normally sent to the base station by the UE.

Figure 5:
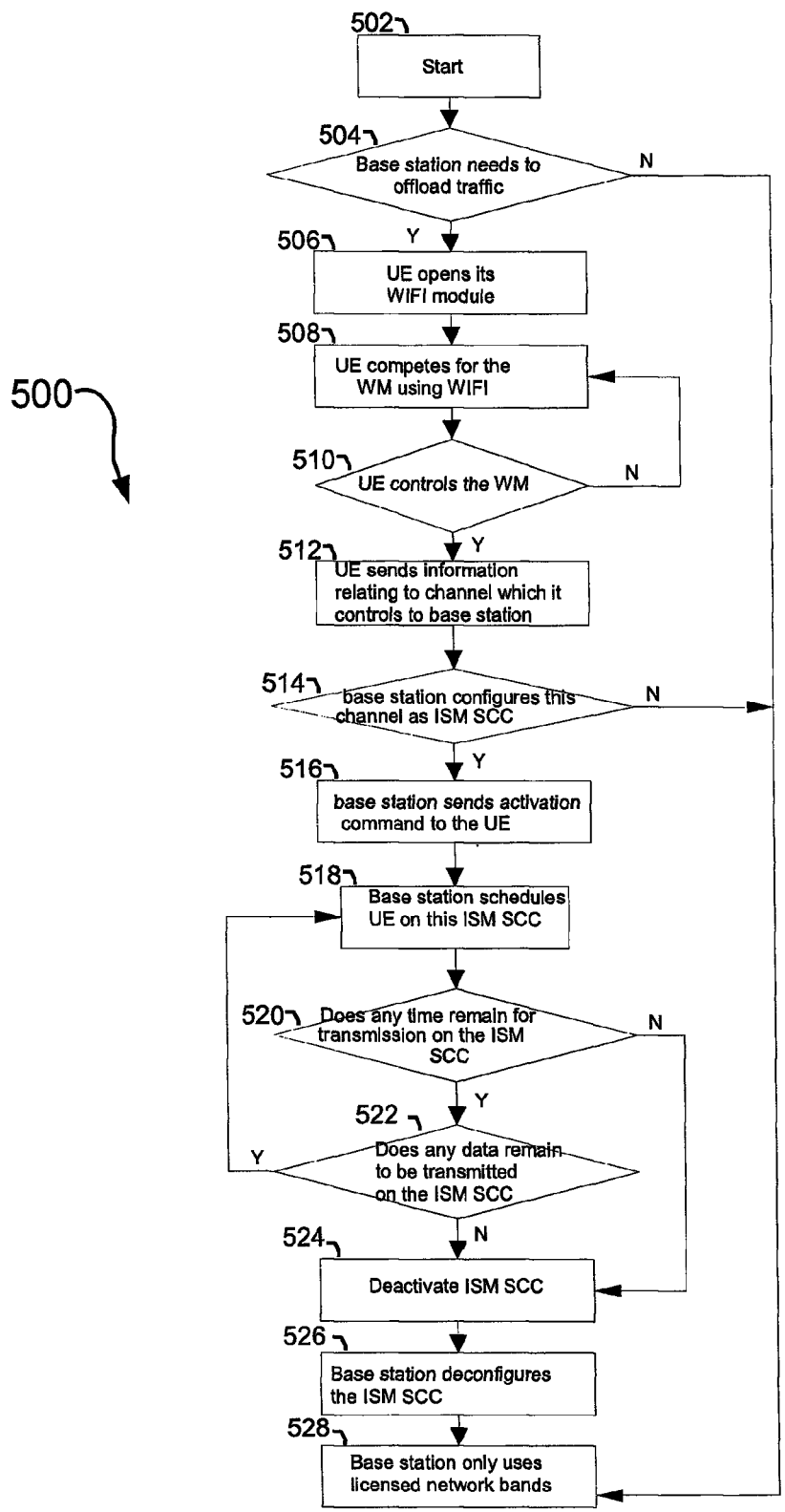
FIG. 5 illustrates a process of communication over the ISM wireless medium according to an embodiment of the present invention.

FIG. 5 illustrates a process of communication over the ISM wireless medium according to an embodiment of the present invention. The process may suitably be carried out using a base station such as the base station 102 and one or more UEs such as the UEs 104A, ... 104N.

The process begins at step 502. Next, at step 504, the base station determines whether traffic for one or more UEs should be offloaded. If the result of the determination is negative, the process proceeds to step 528 and the base station operates using only licensed network bands.

If the result of the determination is affirmative, the process proceeds to step 506 and the base station signals one or more UEs to operate their WiFi modules to compete for the ISM wireless medium. Signaling may take a number of different forms. The base station may request a single UE or a group of UEs to report their WiFi ability and then, after receiving the report, may request UEs with WiFi capability to compete for the wireless medium. Alternatively, the base station may simply request a group of UEs or an individual UE to compete for the wireless medium. In such a case, UEs that have WiFi capability will compete, but those without WiFi capability will ignore or fail to receive the request.

At step 508, the UE or UEs receiving a request to compete and capable of acting on the request compete for the wireless medium in a manner similar to that illustrated in FIG. 2A. At step 510, a determination is made as to whether the UE controls the wireless medium. If the result of the determination is negative, the process returns to step 508. If the result of the evaluation is affirmative, the process proceeds to step 512 and the UE sends to the base station information relating to the channel it controls. Such information may take the form of an ISM report included in a table of LCID values such as that discussed above. At step 514, a determination is made as to whether the base station should configure the channel for that UE as an ISM SCC. If the result of the determination is negative, the process skips to step 528. If the result of the evaluation is affirmative, the process proceeds to step 516 and the UE configures the channel and activates the ISM SCC for the UE by sending an activation command to a UE, which may be only the UE from which the channel information was received, or one or more additional UEs. At step 518, the base station schedules communication with the UE on the configured ISM SCC. At step 520, a determination is made as to whether any time remains available for communication on the channel. If the result of the determination is negative, the process skips to step 524 and the ISM SCC is deactivated for that UE. At step 526, the base station deconfigures the ISM SCC for the UE's configured set and at step 528, the base station uses only licensed bands associated with the network.

Returning now to step 520, if available time remains for communication, the process proceeds to step 522 and a determination is made as to whether any more data needs to be communicated over the ISM SCC. If the result of the determination is affirmative, the process proceeds to step 518 and the base station schedules communication with a UE, which may be the same UE with which communication was scheduled at the last iteration of step 518, or a different UE. If the determination made at step 522 is negative, the process proceeds to step 524.

Figure 6:
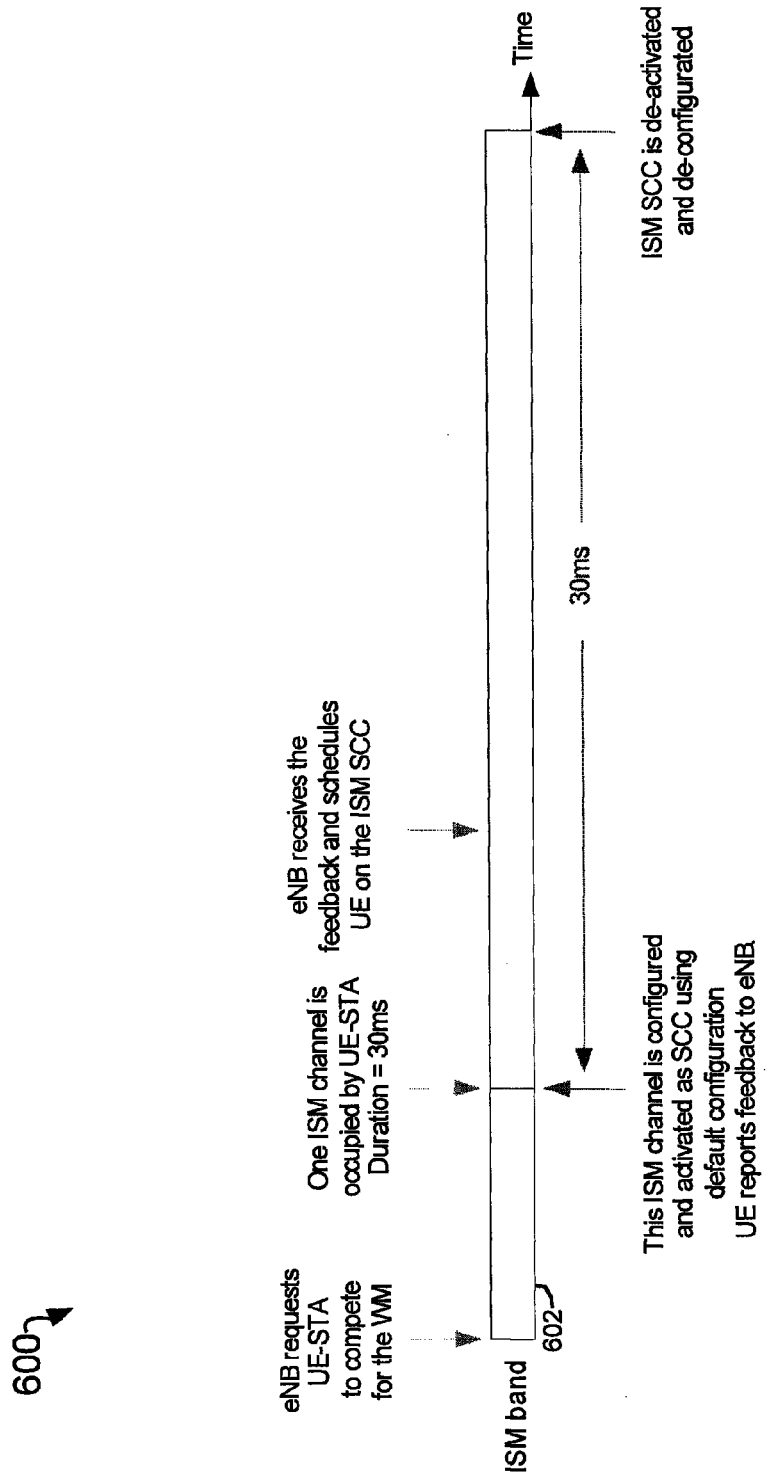
FIGS. 6-9 illustrate various examples of operations and timing carried out by elements of a network 101 operating according to embodiments of the present invention.
Figure 7:
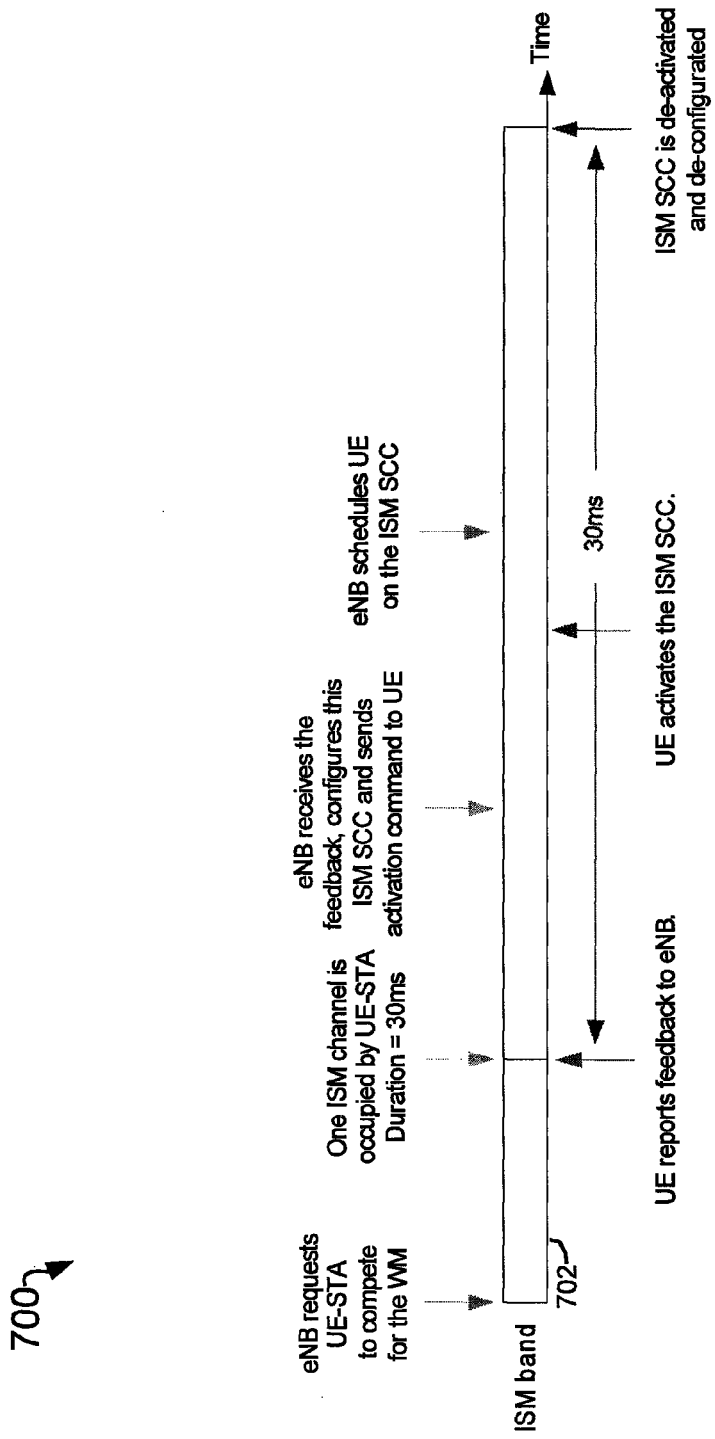
Figure 8:
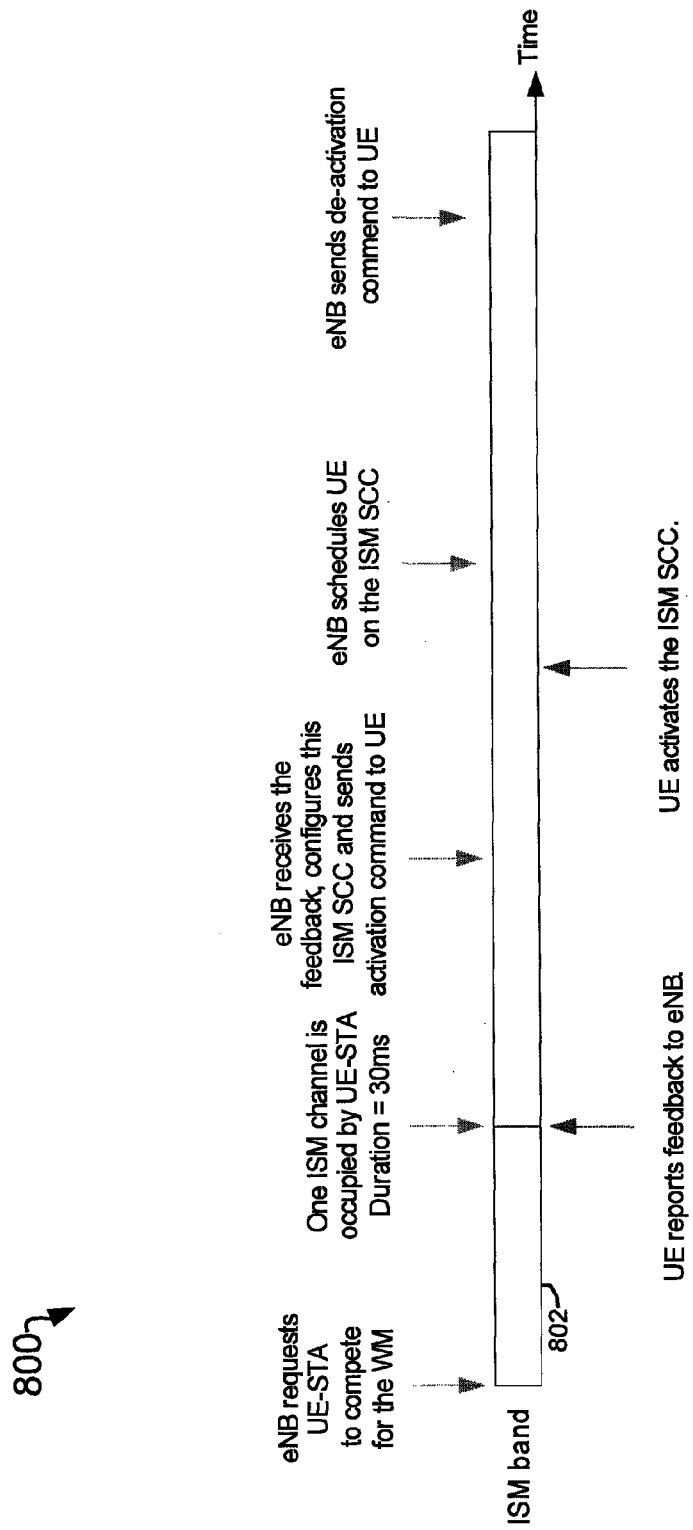

FIGS. 6-8 illustrate various examples of operations and timing carried out by elements of a network 101 operating according to embodiments of the present invention. The elements of the network may include base stations such as the base station 102 and UEs such as the UEs 104A, ..., 104N.

FIG. 6 illustrates a diagram 600 showing the actions and relative timing of a procedure whereby the base station and the UE use and release an ISM SCC according to a specific duration, without explicit activation and deactivation. Such a procedure provides for a relatively low signaling overhead, because activation and deactivation signals do not need to be transmitted between the base station and the UE, but the base station does not have full control over the ISM SCC.

The base station requests a UE capable of operating as an 802.11 station to compete for the wireless medium represented by the ISM band 602. One ISM channel is occupied by the UE for an occupation duration of 30 ms. The UE provides feedback to the base station, reporting information relating to its occupation of the channel to the base station. Once the base station receives the feedback, it schedules a session with a UE on the ISM SCC for the remaining duration of occupation of the channel. The ISM SCC is configured according to predetermined defaults and deactivated and deconfigured at the end of the UE's occupation of the channel.

FIG. 7 illustrates a diagram 700 showing the actions and relative timing of a procedure whereby the base station sends an activation command to a UE, but the UE releases the SCC automatically once the duration of occupation has expired. In this example of the procedure, the base station requests a UE capable of operating as an 802.11 station to compete for the wireless medium represented by the ISM band 702. One ISM channel is occupied by the UE for a duration of 30 ms. The UE sends feedback to the base station, and the base station configures the ISM SCC upon receiving the feedback. The base station also sends an activation command to the UE. The UE activates the ISM SCC and the base station then schedules a session with the UE on the ISM SCC for the duration of the occupation of the channel. At the end of the occupation, the ISM SCC is deactivated and deconfigured.

FIG. 8 illustrates a diagram 800 showing the actions and relative timing of a procedure whereby the base station sends both an activation and a deactivation command to a UE. In this exemplary procedure, the base station requests a UE capable of operating as an 802.11 station to compete for the wireless medium represented by the ISM band 802. One ISM channel is occupied by the UE for a duration of 30 ms. The UE sends feedback to the base station, and the base station configures the ISM SCC upon receiving the feedback. The base station also sends an activation command to the UE. The UE activates the ISM SCC and the base station then schedules a session with the UE on the ISM SCC. The base station then conducts communication with the UE for some time, which need not be the entire duration of the occupation of the channel. When the base station has finished with its communication, it sends a deactivation command to the UE. During the time remaining for occupation of the channel, the UE has the opportunity, and the time available, to activate the ISM SCC for another UE and conduct communication with that UE. When the base station has finished communicating with the UEs, or when the duration of the occupation expires, the base station deconfigures the ISM SCC.

It will be recognized that the WiFi module 318 of FIG. 3 gives the base station 102 the capability of competing for the wireless medium. The WiFi module 318, it will be remembered, is described as a distinct entity for convenience of description, but it will be recognized that the WiFi module 318 may be implemented by any combination of elements and functions that give the base station 102 the ability to operate on the frequencies of the ISM band while adhering to the protocols of the 802.11 standard. Therefore, a base station and a UE according to an embodiment of the present invention are able to both compete for occupation of the wireless medium of the ISM. Suppose, therefore, that the base station 102 needs to offload traffic. It requests the UE 104A to compete for occupation of the wireless medium. At the same time, the base station 102 itself competes for the wireless medium. The base station 102 and the UE 104A may form an 802.11 independent basic service set, or may join as members of an existing independent basic service set.

Figure 9:
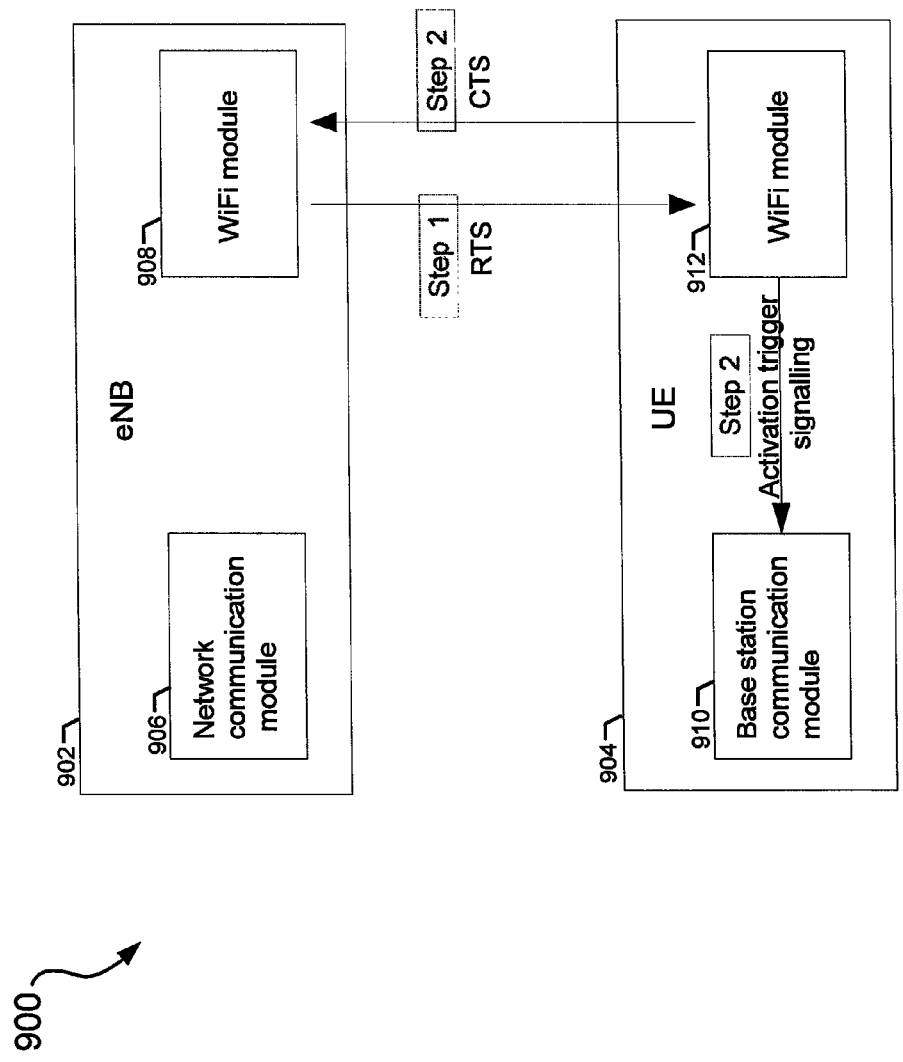

FIG. 9 illustrates a diagram 900 showing the information flow of a procedure of ISM activation according to an embodiment of the present invention. The procedure involves information flows between a base station 902, and a UE 904. The base station 902 comprises a network communication module 906 and a WiFi module 908, and the UE 904 comprises a base station communication module 910 and a WiFi module 912. Once the wireless medium is occupied by the base station 902, it sends a request to send, or RTS, command to the UE 904 using its WiFi module 908. If the UE receives the RTS command at its own WiFi module 912, it will immediately configure and activate the ISM SCC using default configuration parameters and send a clear to send, or CTS, command, back to the base station 902 using the WiFi module 912. It will thus be seen that the UE 904 interprets the RTS command as an implicit activation command. Once the base station 902 has received the CTS command, it will schedule a session with the UE on the activated ISM SCC. During the activation duration, the base station 902 may, if desired, activate and multiplex other UEs.

Figure 10:
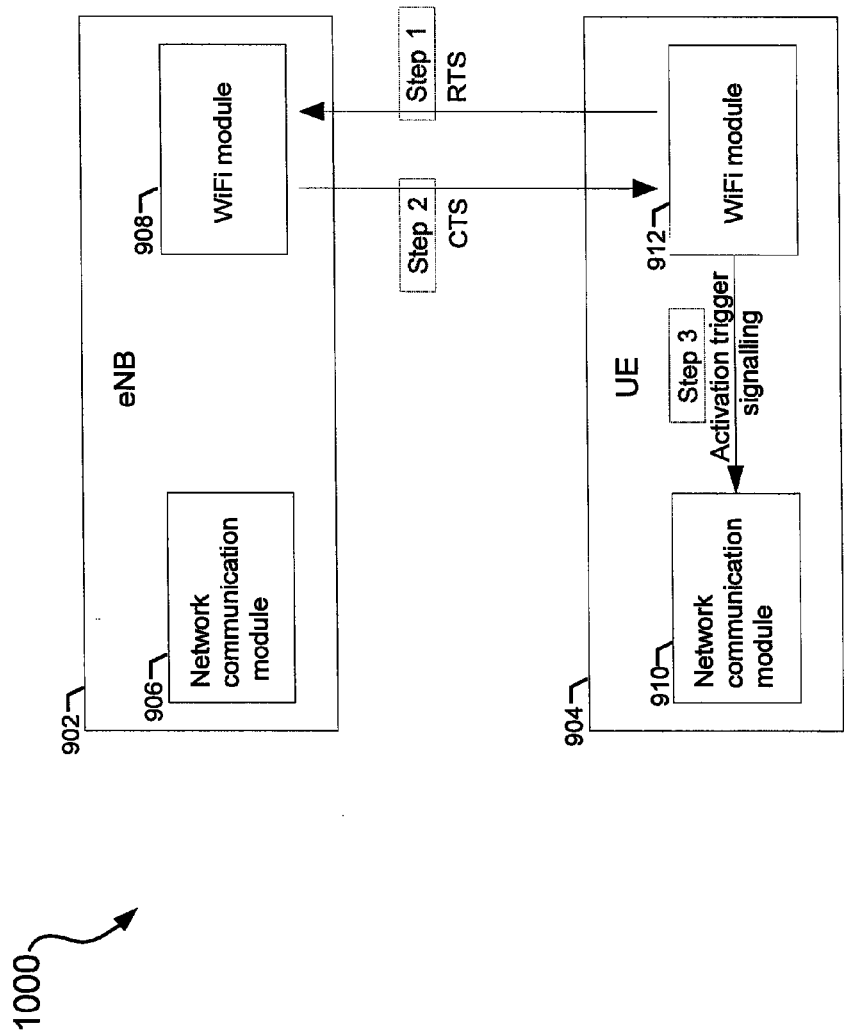
FIG. 10 illustrates a diagram 1000 showing the information flow of a procedure of ISM activation according to an embodiment of the present invention.

FIG. 10 illustrates a diagram 1000 showing the information flow of a procedure of ISM activation according to an embodiment of the present invention. In this procedure, the UE 904 controls the wireless medium and sends a request to send message to the base station 902 using the WiFi module 912. The base station 902 receives the request to send message at the WiFi module 908. The base station 902 determines if offloading of data using the ISM band is desired. If offloading is not desired, the base station 902 does not send a clear to send signal, but if offloading is desired, the base station 902 sends a clear to send signal to the UE 1004 using the WiFi module 908. When the UE 904 receives a clear to send signal, it communicates with the base station communication module 910 to activate the ISM SCC for the UE 904. In this manner, when the UE controls the ISM slot, the clear to send signal acts to activate the ISM SCC for the UE.

Figure 11:
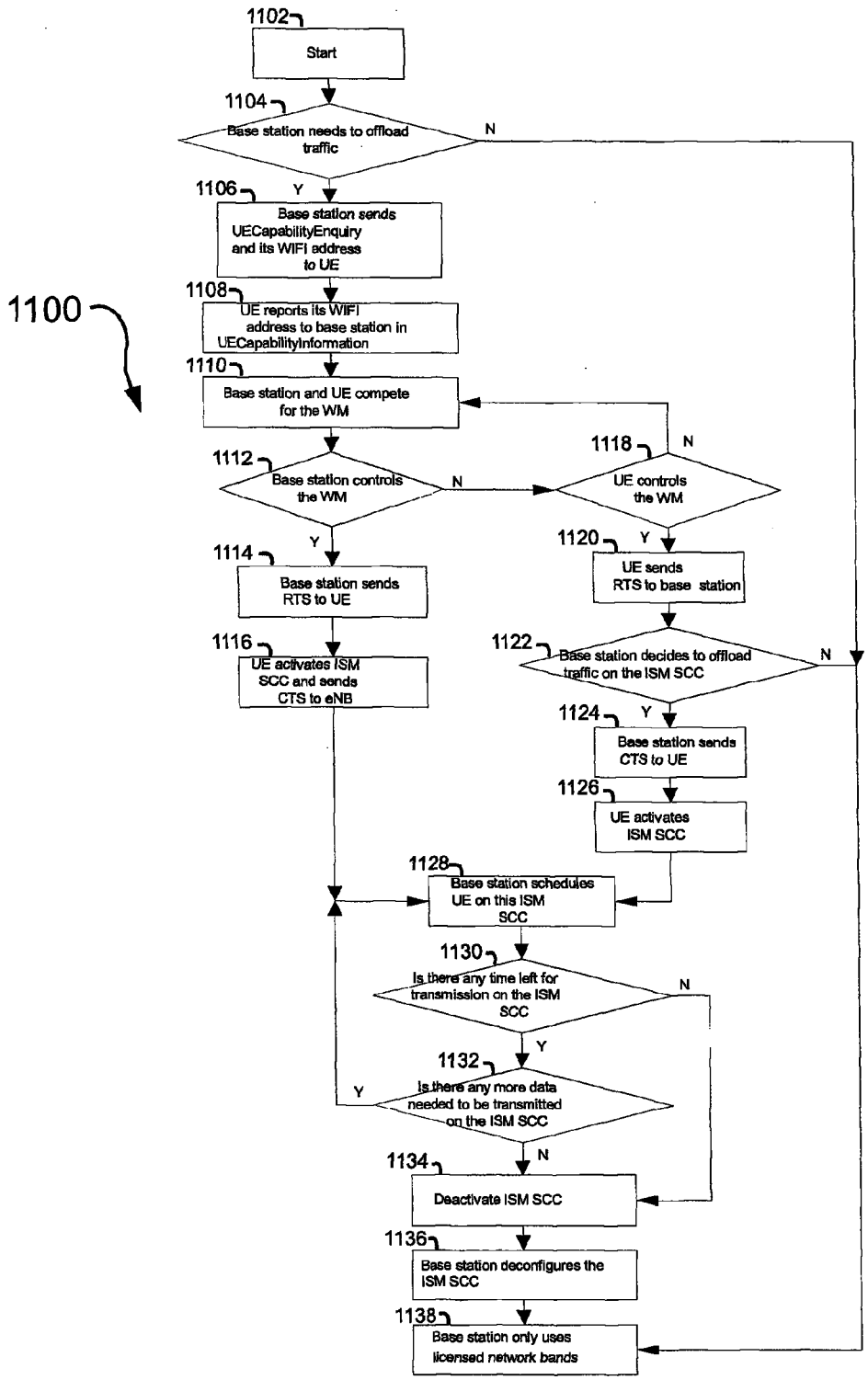
FIG. 11 illustrates a process 1100 of occupation of and communication over an ISM channel according to an embodiment of the present invention.

FIG. 11 illustrates a process 1100 of occupation of and communication over an ISM channel according to an embodiment of the present invention. The process begins at step 1102. At step 1104, a determination is made as to whether the base station needs to offload traffic. If the determination is negative, the process skips to step 1138 and the base station uses only licensed network bands.

If the determination is positive, the process proceeds to step 1106 and the base station sends a message to one or more UEs to determine if they UEs have WiFi capability, with the inquiry suitably taking the form of a UECapabilityEnquiry message following the radio resource control protocol. The message suitably includes the WiFi address of the base station. If a UECapabilityEnquiry message is used, the message suitably includes elements directed to requesting the WiFi capability of the UE, specifically including WiFi in the list of radio access technologies relating to which the inquiry is being made. The UECapabilityEnquiry message also suitably includes an address element, set to the 802.11 MAC address of the base station. These elements are described in additional detail below. The inquiry may be sent to a single UE or members of a group of UEs. A group may be defined, for example, as a specific set of identified UEs, UEs serving a particular category of users or requiring a particular level of service, or any number of other combinations. At step 1108, each UE to which the inquiry is directed that is capable of receiving the inquiry reports its WiFi capability to the base station, suitably as a UE-WIFI-Capability information element in a UE-Capability message. The UE-WIFI-Capability element may suitably appear as an information element in the UE-CapabilityRAT-ContainerList information elements, listing WiFi as one of the radio access technologies for which the UE has capability. The UB-WIFI-Capability information element may suitably include a dot11-version field, specifying the 801.11 protocol version supported by the UE, and an address field, set to the IEEE 802.11 MAC address of the UE.

At step 1110, the base station and all UEs having WiFi capability compete for the wireless medium. At step 1112, a determination is made as to whether the base station controls the wireless medium. If the base station controls the wireless medium, the process proceeds to step 1114 and the base station sends a request to send command to each UE having WiFi capability. At step 1116, the UE activates the ISM SCC and sends a clear to send command to the base station. The process then proceeds to step 1128 and the base station schedules a communication session with a UE on the ISM SCC.

Returning now to step 1112, if the base station does not control the wireless medium, the process branches to step 1118 and a determination is made as to whether a UE controls the wireless medium. If the result of the determination is negative, the process returns to step 1110. If the result of the determination is positive, the process proceeds to step 1120 and the UE sends a request to send command to the base station. At step 1122, the base station determines whether to offload traffic on the channel controlled by the UE. If the result of the determination is negative, the process skips to step 1138 and the base station uses only licensed network bands to conduct communication.

If the result of the determination is positive, the process proceeds to step 1124 and the base station sends a clear to send command to the UE. The process then proceeds to step 1126 and the UE activates the ISM SCC. The process then proceeds to step 1128 and the base station schedules a communication session with the UE on the ISM SCC.

At the end of the communication session with the UE, the process proceeds to step 1130 and a determination is made as to whether any more time remains for transmission on the ISM SCC. If the result of the determination is negative, the process skips to step 1134. If the result of the determination is positively the process proceeds to step 1132 and a determination is made as to whether any additional data remains to be transmitted on the ISM SCC. If the result of the determination is positive, the process returns to step 1128. If the result of the determination is negative, the process proceeds to step 1134 and the ISM SCC is deactivated. The process then proceeds to step 1136 and the base station deconfigures the ISM SCC. The process then proceeds to step 1138 and the base station uses only licensed network bands.

As noted above, the base station may request the WiFi capability of the UE and the UE may report its WiFi capability using radio resource protocol messages that include information elements according to embodiments of the present invention. Listed below are information elements making up suitable protocol messages and descriptions of fields appearing in the information elements.

| UECapabilityEnquiry message | |
|---|---|
| ASN1START | |
| UECapabilityEnquiry ::= | SEQUENCE { |
| rrc-TransactionIdentifier | RRC-TransactionIdentifier, |
| criticalExtensions | CHOICE { |
| c1 | CHOICE { |
| ueCapabilityEnquiry-r8 | UECapabilityEnquiry-r8-IEs, |
| ueCapabilityEnquiry-r11 | UECapabilityEnquiry-r11-IEs, |
| spare2 NULL, spare1 NULL | |
| }, | |
| criticalExtensionsFuture | SEQUENCE { } |
| } | |
| } | |

-continued

| UECapabilityEnquiry message |
|---|
| UECapabilityEnquiry-r8-IEs ::=    SEQUENCE {<br>    ue-CapabilityRequest         UE-CapabilityRequest,<br>    nonCriticalExtension         UECapabilityEnquiry-v8a0-IEs<br>    OPTIONAL<br>}<br>UECapabilityEnquiry-r11-IEs ::=   SEQUENCE {<br>    ue-CapabilityRequest         UE-CapabilityRequest,<br>address                          OCTET STRING<br>}<br>UECapabilityEnquiry-v8a0-IEs ::= SEQUENCE {<br>lateNonCriticalExtension         OCTET STRING           OPTIONAL, -- Need OP<br>nonCriticalExtension             SEQUENCE { }          OPTIONAL -- Need OP<br>}<br>UE-CapabilityRequest ::=         SEQUENCE (SIZE (1..maxRAT-Capabilities)) OF RAT-Type<br>ASN1STOP |

| UECapabilityEnquiry field descriptions |
|---|
| ue-CapabilityRequest |
| List of the RATs for which the UE is requested to transfer the UE radio access capabilities i.e. E-UTRA, UTRA, GERAN-CS, GERAN-PS, CDMA2000, WIFI. |
| address |
| Set to the IEEE 802.11 MAC address. |

| RAT-Type information element |
|---|
| ASN1START<br>    RAT-Type ::=         ENUMERATED {<br>eutra, utra, geran-cs, geran-ps, cdma2000-1XRTT,<br>wifi, spare2, spare1, ...}<br>ASN1STOP |

If UE has WIFI ability, it shall set the contents of UECapabilityInformation message as follows: include the UE-WIFI-Capability within a ue-CapabilityRAT-Container and with the rat-Type set to 'wifi';

| UE-CapabilityRAT-ContainerList information element |
|---|
| ASN1START<br>UE-CapabilityRAT-ContainerList ::=SEQUENCE (SIZE<br>(0..maxRAT-Capabilities)) OF UE-CapabilityRAT-Container<br>UE-CapabilityRAT-Container ::= SEQUENCE {<br>rat-Type                         RAT-Type,<br>    ueCapabilityRAT-Container    OCTET STRING<br>}<br>ASN1STOP |

| UECapabilityRAT-ContainerList field descriptions<br>ueCapabilityRAT-Container |
|---|
| Container for the UE capabilities of the indicated RAT. The encoding is defined in the specification of each RAT:<br>For WIFI: the encoding of UE capabilities is defined in IE UE-WIFI-Capability. |

| UE-WIFI-Capability information element |
|---|
| ASN1START<br>UE-WIFI-Capability ::=         SEQUENCE {<br>dot11-version                     INTEGER (1..16),<br>address                           OCTET STRING<br>}<br>    ASN1STOP |

| UE-WIFI-Capability field descriptions |
|---|
| dot11-version |
| 802.11 version, e.g. 802.11a, 802.11b, 802.11g, etc.<br>address |
| Set to the IEEE 802.11 MAC address. |

While various specific embodiments of the invention are described above, it will be recognized that a wide variety of implementations may be employed by persons of ordinary skill in the art in accordance with the above description and the claims which follow below.

We claim:

1. An apparatus comprising:
a processing system comprising at least one processor and a memory storing a set of computer instructions, wherein the processing system is configured to:
cause the apparatus to receive channel information from a user equipment (UE) reporting the control of an industrial-scientific-medical (ISM) band channel by the UE for a predetermined period of time; and
cause the apparatus to schedule a communication session with another UE over the channel for at least a portion of the predetermined period of time, with the channel being configured and activated as an ISM secondary component carrier (SCC).

2. The apparatus of claim 1, wherein the processing system is further configured to cause the apparatus to analyze the channel information and to determine whether or not to configure the channel as an ISM SCC based on the channel information.

3. The apparatus of claim 1, wherein the channel information comprises one or more of frequency and duration of control by the UE.

4. The apparatus of claim 1, wherein the channel information is received in an uplink control information transmission.

5. The apparatus of claim 1, wherein the channel information is received in the form of a medium access control element.

6. The apparatus of claim 1, wherein the channel information comprises an entry in a logical channel ID (LCID) values report provided by the UE in an uplink transmission.

7. The apparatus of claim 1, wherein the channel is configured and activated as an ISM SCC according to default parameters.

8. The apparatus of claim 1, wherein the processing system is further configured to cause the apparatus to configure the channel as an ISM SCC and send an ISM SCC activation command to the another UE.

9. The apparatus of claim 8, wherein the processing system is further configured to cause the apparatus to send an ISM SCC deactivation command to the another UE.

10. The apparatus of claim 8, wherein the ISM SCC activation command takes the form of a request to send command, and wherein the processing system further causes the apparatus to:
compete for control of the channel;
upon achieving control of the channel, send a request to send command to the another UE;
upon receiving a clear to send command from the another UE, schedule a communication session with the another UE over the ISM SCC.

11. The apparatus of claim 1, wherein the processing system is configured to cause the apparatus to transmit an inquiry to one or more UEs requesting a report of the WiFi capability of each UE.

12. The apparatus of claim 11, wherein the request takes the form of an entry in a UE-Capability-Request command.

13. An apparatus comprising:
a processing system comprising at least one processor and a memory storing a set of computer instructions, wherein the processing system is configured to:
cause the apparatus to receive a command from a base station to compete for control of a wireless medium comprising a portion of an industrial-scientific-medical (ISM) radio frequency band; and
upon control by the apparatus of the wireless medium for a predetermined time period, to cause the apparatus to report to the base station channel information relating to the channel controlled by the apparatus so the base station can use the channel controlled by the apparatus to communicate with a user equipment for at least a portion of the predetermined time period with the channel being configured and activated as an ISM secondary component carrier (SCC).

14. The apparatus of claim 13, wherein the processing system is further configured to cause the apparatus to report its wireless networking capability upon receiving a request from a base station.

15. The apparatus of claim 14, wherein the report of the wireless networking capability of the apparatus takes the form of an entry in a UE-CapabilityRAT-ContainerList information element.

16. The apparatus of claim 13, wherein the processing system is further configured to cause the apparatus to configure and activate an ISM secondary component carrier (SCC) according to default parameters upon control by the apparatus of the wireless medium.

17. The apparatus of claim 13, wherein the processing system causes the apparatus to send a request to send command to the base station upon control by the apparatus of the wireless medium and to activate an ISM SCC upon receiving a clear to send command from the base station.

18. A method comprising:
receiving channel information from a user equipment (UE) reporting the control of an industrial-scientific-medical (ISM) band channel by the UE for a predetermined period of time; and
scheduling a communication session with another UE over the channel, with the channel for at least a portion of the predetermined period of time being configured and activated as an ISM secondary component carrier (SCC).

19. The method of claim 18, wherein the processing system is further configured to cause the apparatus to configure the channel as an ISM SCC and send an ISM SCC activation command to the another UE.

20. The method of claim 19, wherein the ISM SCC activation command takes the form of a request to send command, and wherein the method further comprises:
competing for control of the wireless medium;
upon achieving control of the wireless medium, sending a request to send command to the another UE; and
upon receiving a clear to send command from the another UE, scheduling a communication session with the another UE over the ISM SCC.

* * * * *